F. N. TREVOR.
TWINE HOLDER.
APPLICATION FILED DEC. 1, 1916.
1,245,403. Patented Nov. 6, 1917.
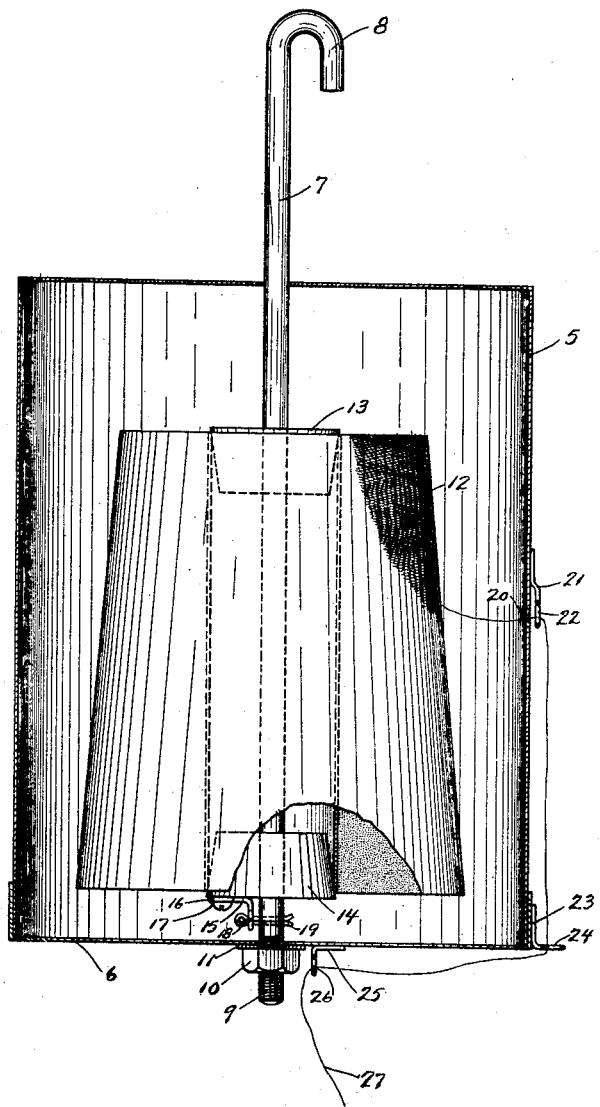
WITNESSES:
INVENTOR
Frank N. Trevor
BY
ATTORNEY

UNITED STATES PATENT OFFICE.

FRANK N. TREVOR, OF BUFFALO, NEW YORK.

TWINE-HOLDER.

1,245,403.       Specification of Letters Patent.      Patented Nov. 6, 1917.

Application filed December 1, 1916. Serial No. 134,473.

*To all whom it may concern:*

Be it known that I, FRANK N. TREVOR, a citizen of the United States of America, residing in the city of Buffalo, county of Erie, and State of New York, have invented certain new and useful Improvements in Twine-Holders, of which the following is a full, clear, and exact description.

One of the objects of my invention has been to provide a device in which twine, which is used for tying parcels or the like, may be suspended in an out-of-the-way place and be simple and convenient to use.

Another object has been to provide a rotating twine holding device on which any desired advertisement may be displayed.

In the accompanying drawing, forming a part of this application, I have shown one view of my device, which is a vertical, sectional elevation.

In the drawing, 5 represents a cylindrical drum, which is provided at its lower end with a cover 6, and is arranged to contain the twine and other parts of the device. Arranged centrally through the drum is a spindle 7, which passes through a central aperture in the head of the drum and also through a central aperture in the cover 6. This spindle is provided, at its upper end, with a hook 8, whereby it may be suitably suspended and prevented from rotation, and at its lower end with screw-threads 9 on which is disposed a suitable nut 10 and washer 11. The drum is thus rotatably arranged upon this spindle and prevented from downward movement by the nut 10 and washer 11.

12 is the spool of twine of the usual form, having bushings 13 and 14 arranged one at each end of the spool. These bushings are provided with the customary central openings and are disposed about the spindle 7. The lower bushing 14 is provided with a dog 15, preferably in the form of a bent wire, which has the end 16 thereof secured to the bushing preferably by means of the screw 17, and the other end 18 arranged at right angles and bent in the form of a ring. This end 18 is arranged close to the spindle 7, and passing through the ring formed in this end and an aperture formed in the spindle 7, is a cotter pin 19. This secures the bushing 14, together with the spool of twine disposed thereon, against relative rotation with the spindle 7, which keeps the spool stationary.

In one side of the drum 5 is provided, at a point equidistant of its ends, an aperture 20. Arranged in front of this aperture is a guide 21, formed preferably of wire and provided at its lower end with a ring 22. The guide 21 is secured preferably to the drum by means of solder, and is arranged so as to have its ring 22 in register with the opening 20 in the side of the drum. A lower guide 23 is secured preferably by means of solder to the cover 6 and arranged to be directly beneath the guide 21. This guide 23 is provided with a right-angled bend and formed with a ring 24 at its outer end. An inner guide 25 is secured to the bottom of the cover 6 near its center. This guide is also bent at right angles and provided at its outer, bent end with a ring 26. These guides 21, 23 and 25 form supports for the twine as it is being unwound from the spool 12, and the free end thereof is passed through the opening 20, ring 22, ring 24 and then through the ring 26, and the end brought down within easy reach.

The drum 5 is preferably cylindrical in form and upon the outer surface thereof may be pasted, or secured in any other well known way, any desired advertisement which can be easily visible from the counter, or like place, when in use.

When the device is to be used, it is suspended by means of the hook 8 in such a manner that the spindle will be held against rotation. After the end of the twine has been threaded in the manner just above described, the device is ready for use. It will be seen that when the free end 27 of the twine is pulled, the drum 5 will be rotated as the twine is unwound from the spool 12, inasmuch as the spool itself is stationarily arranged and cannot rotate. As the drum rotates, the advertisement carried by it will also rotate and thereby attract attention. When the desired amount of twine has been drawn from the spool and broken off, the momentum of the drum will be sufficient to cause it to continue to rotate and thereby draw up a portion of the free end of the twine, winding it back on the spool 12 in the reverse direction. Thus the free end of the twine is also drawn up out of the way.

Obviously, some modifications of the details herein shown and described may be made without departing from the spirit of my invention or the scope of the appended claims, and I do not wish to be limited to the exact embodiment herein shown and described.

Having thus described my invention, what I claim is:

1. A twine holder comprising a stationary spindle, a spool of twine rigidly mounted upon said spindle, a drum, a cover therefor, said drum and said cover being rotatably carried by said spindle, and inclosing said spool means for directing the twine through said drum, and means for directing the twine to the bottom of said cover near its center.

2. A twine holder comprising a stationary spindle, a spool of twine rigidly mounted upon said spindle, a drum, a cover therefor, said drum and said cover being rotatably carried by said spindle, and inclosing said spool, said drum being provided with an aperture in its side and twine guides secured to said drum and said cover.

3. A twine holder comprising a stationary spindle, a spool of twine mounted upon said spindle, means connected with said spool and spindle for preventing said spool from rotating, a drum, a cover therefor, said drum and said cover being rotatably carried by said spindle, and twine guiding means carried by said drum and cover.

4. A twine holder comprising a stationary spindle, a spool of twine, bushings for said spool, said bushings being mounted upon said spindle, a dog secured to one of said bushings, means for securing said dog to said spindle, a drum, a cover therefor, said drum and said cover being rotatably carried by said spindle, and twine guides secured to said drum and to said cover.

In testimony whereof, I have hereunto signed my name in the presence of two subscribing witnesses.

FRANK N. TREVOR.

Witnesses:
  J. WM. ELLIS,
  WALTER H. KELLEY.

Copies of this patent may be obtained for five cents each, by addressing the "Commissioner of Patents, Washington, D. C."